United States Patent [19]

Crepeau

[11] Patent Number: 4,461,875

[45] Date of Patent: Jul. 24, 1984

[54] ROOF SHEETING AND FLASHING ELASTOMERIC COMPOSITION

[75] Inventor: Allen E. Crepeau, Southbury, Conn.

[73] Assignee: Uniroyal, Inc., New York, N.Y.

[21] Appl. No.: 381,259

[22] Filed: May 24, 1982

Related U.S. Application Data

[63] Continuation-in-part of Ser. No. 363,325, Mar. 29, 1982, abandoned.

[51] Int. Cl.$^3$ ............................................. C08C 19/20
[52] U.S. Cl. ..................................... 525/348; 52/58; 52/309.1; 428/141; 525/331.8; 525/332.6
[58] Field of Search ............... 428/141, 143, 147; 525/348, 331.8, 332.6; 52/58, 309.1, 309.3, 309.13, 309.14, 309.16, 309.17

[56] References Cited

U.S. PATENT DOCUMENTS

| | | | |
|---|---|---|---|
| 3,404,495 | 10/1968 | Simpson, Jr. | 52/58 |
| 4,039,706 | 8/1977 | Tajima | 428/143 |
| 4,248,926 | 2/1981 | Tajima | 428/253 |

FOREIGN PATENT DOCUMENTS

| | | | |
|---|---|---|---|
| 723351 | 12/1965 | Canada | 52/58 |
| 1310003 | 3/1973 | United Kingdom | 52/58 |

Primary Examiner—C. A. Henderson
Attorney, Agent, or Firm—Marvin Bressler

[57] ABSTRACT

A composition comprising 100 parts of an elastomer selected from the group consisting of EPDM, butyl rubber and a EPDM-butyl rubber mixture; 0.1 to 3.0 parts of a compound having the structural formula $[(CH_2)_nNCS]_2S_6$, where n is 4 or 5; and 0 to 5.0 parts of a sulfur donor curative is disclosed. The composition has particular application as roof sheeting or flashing.

12 Claims, No Drawings

ROOF SHEETING AND FLASHING ELASTOMERIC COMPOSITION

CROSS-REFERENCE TO RELATED APPLICATION

This is a continuation-in-part of U.S. patent application Ser. No. 363,325 filed Mar. 29, 1982 now abandoned.

BACKGROUND OF THE INVENTION

1. Field of the Invention

The instant invention is directed to an elastomeric composition selected from the group consisting of ethylene-propylene-non-conjugated diene terpolymer (EPDM), isobutylene-conjugated diene copolymer (butyl rubber) and mixtures of the terpolymer and copolymer. More particularly, the instant invention is directed to an elastomeric composition selected from the group consisting of ethylene-propylene-non-conjugated diene terpolymer, isobutylene-conjugated diene copolymer and mixtures of the terpolymer and copolymer which may be applied to a roof as roofing sheets or flashing members which, upon exposure to ambient influences, have the ability to crosslink.

2. Background of the Prior Art

Elastomeric ethylene-propylene-non-conjugated diene terpolymer (EPDM) and isobutylene-conjugated diene copolymer (butyl rubber) compositions are well known in the art. The use of EPDM and butyl rubber compositions as the material of construction of roof sheeting is also known in the art. Such sheeting, provided in the cured, or crosslinked, state provide excellent materials for use on a roof in those applications where flat material is acceptable for disposition on equally flat or moderately contoured roofing structures. However, when the crosslinked EPDM or butyl rubber sheeting of the prior art is disposed on intricately contoured surfaces of a roof, such as parapet, chimney, ventilator sections and the like, the flat crosslinked sheeting of the prior art is not acceptable. That is, crosslinked EPDM or butyl rubber lacks the formability to successfully and permanently follow, cover and retain irregular shaped contours.

Roofing material used to follow irregular contours is known as flashing. Crosslinked EPDM or butyl rubber roof sheeting is not normally used as flashing because gaps readily develop around the contours between the sheeting sections of the roof, and those other portions of the roof in which the EPDM or butyl rubber is employed as flashing.

Whereas crosslinked EPDM or butyl rubber sheeting have each established excellent reputations as effective barriers to roof leaks on the surfaces upon which they are applied, still, this protection has not been available to those portions of the roof which are characterized by their irregular shape. Thus, the excellent protection afforded by EPDM or butyl rubber compositions has not been available as flashing. This results in the inability to protect those section of the roof characterized by irregular shape against leakage. The utilization of EPDM or butyl rubber roof sheeting, a most effective long term protector against water leakage, is seriously compromised by this defect in cured EPDM and butyl rubber.

SUMMARY OF THE INVENTION

It has now been found that compositions selected from the group consisting of EPDM, butyl rubber and mixtures thereof may be applied to roofs, even those having highly contoured surfaces, lending the same protection to irregular shaped sections as that provided to flat section of a roof by cross-linked EPDM and butyl rubber sheeting. This is accomplished by providing EPDM, butyl rubber or a mixture of EPDM and butyl rubber which is flexible and formable and thus able to follow intricate roof contours. This unique flexible EPDM, butyl rubber or EPDM-butyl rubber roofing composition is supplied in the uncured state. Uncured EPDM, butyl rubber or EPDM-butyl rubber mixture does not possess elasticity, a characteristic of these compositions in the crosslinked state. This permits the EPDM, butyl rubber or EPDM-butyl rubber mixture to be formed around odd shapes and corners to effectively seal these areas. The novel property provided by the new EPDM, butyl rubber or EPDM-butyl rubber mixture composition of this invention is the ability to self-cure under ambient conditions.

In accordance with the instant invention, a composition is provided which comprises 100 parts of a elastomer selected from the group consisting of ethylene-propylene-non-conjugated diene terpolymer (EPDM) isobutylene-conjugated diene copolymer (butyl rubber) and a mixture of EPDM and butyl rubber; 0.1 to 3.0 parts of a compound having the structural formula $[(CH_2)_nNCS]_2S_6$, where n is 4 or 5; and from 0 to 5.0 parts of a sulfur donor curative, the compound having the structural formula $[(CH_2)_nNCS]_2S_6$ and the sulfur donor curative providing at least 0.25 parts of total available sulfur, wherein all of the parts recited are by weight.

DETAILED DESCRIPTION

The composition of this invention comprises an elastomer selected from the group consisting of ethylene-propylene-non-conjugated terpolymer (EPDM), isobutylene-conjugated diene copolymer (butyl rubber) and a mixture of EPDM and butyl rubber, present with a compound having the structural formula $[(CH_2)_nNCS]_2S_6$, where n is 4 or 5 and, optionally, with a sulfur donor curative.

The compound having the structural formula $[(CH_2)_nNCS]_2S_6$ where n is 4 or 5 is present in the composition in a concentration of 0.1 to 3.0 parts by weight based on 100 parts by weight of elastomer. More preferably, the concentration of this compound, a hexasulfide, per 100 parts by weight of elastomer, is in the range of between 0.2 and 2.0 parts by weight. Most preferably, the concentration of hexasulfide is between 0.3 and 1.2 parts by weight per 100 parts by weight of elastomer. In a preferred embodiment the compound having the structural formula $[(CH_2)_nNCS]_2S_6$ is dipentamethylenethiuram hexasulfide.

The sulfur donor curative, which, if present, contributes with the hexasulfide to provide the minimum necessary total available sulfur required in this composition, 0.25 parts per 100 parts of elastomer, may be one or more of the following sulfur donating compounds: sulfur; dimethyl-diphenylthiuram disulfide; dipentamethylenethiuram tetrasulfide; tetraethylthiuram disulfide; tetramethylthiuram disulfide; alkyl disulfides; selenium diethyldithiocarbamate; selenium dimethyldithiocarbamate; 4,4'-dithiodimorpholine; and N,N'-dithiobis(hexahydro-2H-azepinon-2). It should be appreciated that this list is not exclusive and other sulfur donating compounds, known in the art, are within the contemplation of this invention.

In some embodiments, within the scope of this invention, one or more additional vulcanizing accelerators may be included in the composition of this invention. These accelerators are distinguished from the two above described constituents in that these additional accelerators do not have sulfur donor capability. Among the classes of accelerators contemplated for incorporation, alone or in combination with one or more additional accelerators, in the composition of this invention are: dialkylthiourea; trialkylthiourea; tetraalkylthiourea; 2-mercaptoimidazoline; N,N'-diphenylguanidine; N,N-di(2-methylphenyl)guanidine; salts of dialkyldithiocarbamates, wherein the alkyl groups may have from 1 to 6 carbon atoms and the salts may be formed with bismuth, cadmium, copper, iron, lead, potassium, selenium, sodium, tellurium or zinc; monoalkylamines; dialkylenethiuram monosulfides or tetraalkylenethiuram monosulfides, where the alkylene or alkyl groups have from 1 to 8 carbon atoms; mercaptobenzothiazole, 4-morpholinylbenzothiazyl disulfide and zinc mercaptobenzothiazole.

Although any of the above recited compounds may be employed, alone or in combination, in the composition of this invention, sulfur is especially preferred as the sulfur donating curative of this invention.

The concentration of the sulfur donor curative ranges from 0 to 5.0 parts by weight per 100 parts of elastomer. In a more preferred embodiment, the curative is present in an amount of 0.4 to 3.0 parts and still more preferably the curative concentration is 0.5 to 2.0 parts, where the parts recited are by weight per 100 parts by weight of elastomer.

In one preferred embodiment EPDM is used as the elastomer in the composition of this invention. The EPDM used is a terpolymer of ethylene, one or more olefin monomer(s) having the general formula $H_2C=CHR$, where R is an alkyl group having from 1 to 7 carbon atoms. In a preferred embodiment this olefin is propylene. The EPDM also includes a non-conjugated diene which may be a $C_6-C_{12}$ linear or $C_9-C_{10}$ bridged ring hydrocarbon diene copolymerizable with the aforementioned monomers. The most commonly employed non-conjugated dienes in the terpolymer of this invention are 1,4-hexadiene, dicyclopentadiene and 5-ethylidene-2-norbornene.

In another preferred embodiment the elastomer of the composition of this invention is butyl rubber. The butyl rubber of this invention is isobutylene-conjugated diene copolymer comprising from 1 to 10% by weight of conjugated diene. Among the dienes within the contemplation of this invention are 2-methyl-1,3-butadiene; 1,3 butadiene; and 2,3-dimethylbutadiene-1,3. Of these 2-methyl-1,3-butadiene is most preferred.

In yet another preferred embodiment the elastomer is a mixture of EPDM and butyl rubber, where the EPDM and butyl rubber has the meanings given in the above two paragraphs. There is no limitation on the relative amounts of the two constituents in that either component alone produces the novel result obtained in this invention.

It is within the contemplation of this invention that additional ingredients may be incorporated into the composition of this invention. Among the additives that can be present in this composition are processing oils, plasticizers and filler and reinforcing agents. Among the filler and reinforcing agents especially useful in the composition of this invention are carbon black, silicates, talc, clay, calcium carbonate and the like.

The compounding of the composition of this invention may be accomplished by any suitable means including an internal mixer, a transfer mixer, an extruder or an open mill. Independent of the method of compounding the composition, the resulting composition has a cure rate which correlates with the development of crosslinking.

In a preferred embodiment of this invention a roofing composition is provided, which comprises the composition of this invention. The roofing composition may be in the form of sheets of the desired dimensions, usually formed by calendering or extruding the sheet, then cutting the sheet to proper size and shape. The sheets may be cut for use as roof sheeting or flashing members.

When used as a roof covering, the composition of this invention may cover any roofing base material, such as wood, composition board, concrete, brick or metal. In many applications, insulating or vapor barrier layers may be first placed over the roof bottom prior to the disposition of the composition of this invention. It is emphasized, however, that such layers are not essential to the carrying out of this invention.

Another aspect of this invention is a method of protecting roofs from water leaks by disposition thereupon of the composition of this invention.

In another preferred embodiment the composition of this invention is employed as a water liner. In this application sheets of the composition are employed as a reservoir liner, a pond liner and the like.

The composition and method of this invention may be better understood in conjunction with the following examples. These examples illustrative of the scope of the instant invention, are given by way of illustration and should not be construed as limiting the invention in any way.

EXAMPLE 1

A general "master batch" was prepared by adding 33⅓ parts by weight of EPDM to a type "B" laboratory Banbury [trademark] internal mixer set at 77 revolutions per minute. To this was added 125 parts by weight of carbon black (high structure HAF type N-347); 95 parts by weight of extender oil (paraffinic petroleum oil, SUS at 37.8° C.: 2642); 50 parts by weight of magnesium silicate (Mistron Vapor [trademark], particle size equal to or less than 6 microns); 5 parts by weight zinc oxide and 1 part by weight of stearic acid. To this was added 66⅔ parts by weight of EPDM. Thus, the EPDM constituent comprised 100 parts by weight of the composition. After the remaining EPDM was added, the ram was lowered. Mixing for one minute followed at which time the temperature reached 115° C. The ram was then raised, the ram and throat of the mixer were swept, and the ram was again lowered. Mixing continued for an additional 90 seconds at which time the compound temperature reached 138° C. The mixer was stopped, the ram was raised, and the master batch was dropped on a mill to cool.

Five compositions were prepared employing the above master batch. The EPDM uncured rubber, comprising 100 parts of the 376 parts by weight of the master batch, included a blend of 50 parts of a terpolymer noted as "EPDM I." EPDM I is a terpolymer containing 51.9% ethylene, 39.1% propylene and 9.0% 5- ethylidene-2-norborene, all percentages being by weight. EPDM I had a Mooney viscosity (ML-1 plus 4) at 125° C. of 68. The remaining 50 parts by weight of EPDM was a terpolymer denoted as "EPDM II." EPDM II is a terpolymer containing 71.6% ethylene, 23.9% propylene and 4.5% 5-ethylidene-2-norbornene, said percentages based on the total weight of the terpolymer. EPDM II had a Mooney viscosity (ML-1 plus 4) at 125° C. of 77.

Five samples, Samples Nos. 1-5, were prepared from these five compositions, whose preparation is described above. Each sample, as stated above, included 376 parts by weight of the master batch, comprising 100 parts by weight of EPDM, the exact constituency of which is recited above. To the master batch was added dipentamethylenethiuram hexasulfide (DPTH) and sulfur, the concentrations of which are summarized in Table I below.

The mixture of the master batch, DPTH and sulfur were formed into samples by banding the mixture on the back roll of a 20.32×40.64 cm mill at a preset temperature of 95° C. (front roll) and 65° C. (back roll). The nip between the rolls was adjusted to provide a 2.03 mm sheet, while maintaining about 2 cm rolling bank of compound. After 30 seconds, air free sheet was cut from the mill and dusted with mica for easier handling.

For testing purposes, six 7.62×15.24 cm samples were cut from the dusted sheet and hung in an air circulating oven. From both the unaged and aged samples standard Dumbbell Die A were cut according to ASTM D-412. Tensile strength at break, measured in megaPascals, and elongation at break, measured in percent, measurements were made using an Instron [trademark] tester Model LTD, and the measured results were calculated in accordance with ASTM D-412. All testing was carried out at 23° C.

In addition to strength testing, the curing characteristics of the samples were investigated using a Monsanto Rheometer [trademark], model MPV, at 3° arc, 15 Hz, square die. The curing characteristics are reported as the increase in torque, measured in Newton meters, between the minimum value and the value obtained after 60 minutes at 100°.

TABLE I

| Constituents, in parts by Weight | Sample No. | | | | |
|---|---|---|---|---|---|
| | 1 | 2 | 3 | 4 | 5 |
| Master Batch | 376 | 376 | 376 | 376 | 376 |
| DPTH | 0.1 | 0.3 | 0.6 | 1.2 | 2.4 |
| Sulfur | 0.5 | 0.5 | 0.5 | 0.5 | 0.5 |
| Physical Properties | | | | | |
| Torque (60), cN.m | 1.13 | 5.65 | 9.04 | 11.3 | 13.56 |
| Unaged* Tensile Strength at Break, MPa | 3.65 | 3.65 | 3.65 | 3.65 | 3.65 |
| Aged** Tensile Strength at Break, MPa | 4.83 | 6.0 | 8.0 | 12.1 | 16.6 |
| Change in Tensile Strength % | +32 | +64 | +119 | +230 | +355 |
| Unaged Elongation at Break,* % | 640 | 640 | 640 | 640 | 640 |
| Aged Elongation at Break,** % | 340 | 370 | 380 | 380 | 390 |
| Change in % Elongation, % | −47 | −42 | −41 | −41 | −39 |

*Master batch, not including DPTH or sulfur
**28 days at 70° C. in a circulating air oven The results of these tests clearly indicate that even under mild aging conditions, 70° C., a temperature readily encountered on the roof of a building, compositions within the contemplation of this invention surprisingly develop a state of cure from satisfactory to excellent depending on the concentration of the hexasulfide of this invention, in this example DPTH, and, optionally, the sulfur donating curative, in this example, sulfur.

EXAMPLE 2

Four samples were prepared using the master batch of Example 1, that is, a master batch which included a blend of 50 parts EPDM I and 50 parts EPDM II in combination with a varying amount of DPTH, a constant amount of sulfur and one additional accelerator, zinc O,O-di-n-butylphosphorodithioate (ZBPD). A summary of the constituents of these compositions, Samples 6-9, and the results of physical testing, as described in Example 1, employing these four samples, are tabulated in Table II.

TABLE II

| Constituents in parts by Weight, | Sample No. | | | |
|---|---|---|---|---|
| | 6 | 7 | 8 | 9 |
| Master Batch | 376 | 376 | 376 | 376 |
| DPTH | 0.1 | 0.3 | 0.6 | 1.2 |
| ZBPD | 1.5 | 1.5 | 1.5 | 1.5 |
| Sulfur | 0.5 | 0.5 | 0.5 | 0.5 |
| Physical Properties | | | | |
| Torque (60), cN.m | 1.13 | 6.78 | 15.82 | 31.64 |
| Tensile Strength, MPa, unaged | 3.65 | 3.65 | 3.65 | 3.65 |
| Tensile Strength, MPa, aged* | 6.14 | 8.83 | 12.20 | 15.32 |
| Elongation, % aged* | 380 | 420 | 430 | 430 |

*28 days at 70° C., air circulating oven

The results of these tests, summarized in Table II, demonstrate the cure efficiency of compositions containing DPTH, at relatively low curative concentrations, ZBPD and sulfur.

EXAMPLE 3

Additional master batch concentrates were prepared in accordance with the procedure enumerated in Example 1. However, different blends of EPDM were employed. That is, the relative concentrations of ethylene and propylene were changed. In addition, the termonomer was also varied. Thus, samples using dicyclopentadiene (DCPD) and 1,4-hexadiene (HXD) were employed in the samples of Example 3, as well as samples using the diene of Examples 1 and 2, 5-ethylidene-2-norbornene (ENB).

Six compositions, denoted as Samples 10-15, were prepared from the master batches in which the concentration of the DPTH, and sulfur, were maintained at a constant level of 0.4 parts and 0.5 parts, respectively, by weight per 100 parts EPDM. These samples included additional accelerators within the contemplation of this invention. The concentration of these accelerators was maintained constant in all the compositions of this example.

Table III below summarizes and defines the six compositions produced. In addition, these samples were tested in accordance with the procedures set forth in Example 1.

TABLE III

| EPDM: No. | Sample No. 10 III | 11 IV | 12 V | 13 VI | 14 VII | 15 VIII |
|---|---|---|---|---|---|---|
| Ethylene, % | 64.6 | 64.6 | 64.9 | 51.0 | 54.3 | 53.6 |
| Propylene, % | 30.4 | 30.4 | 30.6 | 47.0 | 42.6 | 40.4 |
| Termonomer, type | DCPD | DCPD | ENB | ENB | HXD | HXD |
| Termonomer, % | 5.0 | 5.0 | 4.5 | 2.0 | 3.1 | 6.0 |
| ML-1 plus 4, @ 100° C. | 49 | 85 | 62 | 65 | 70 | 74 |
| Constituents, Parts by Weight | | | | | | |
| EPDM | 100 | 200[1] | 100 | 100 | 100 | 100 |
| N-347 Carbon Black | 125 | 125 | 125 | 125 | 125 | 125 |
| Extender oil | 75 | —[1] | 85 | 80 | 85 | 85 |
| Mineral filler[2] | 50 | 50 | 50 | 50 | 50 | 50 |
| Stearic Acid | 1.0 | 1.0 | 1.0 | 1.0 | 1.0 | 1.0 |
| Zinc oxide | 5.0 | 5.0 | 5.0 | 5.0 | 5.0 | 5.0 |
| DPTH | 0.4 | 0.4 | 0.4 | 0.4 | 0.4 | 0.4 |
| MBT[3] | 0.4 | 0.4 | 0.4 | 0.4 | 0.4 | 0.4 |
| ZDDC[4] | 0.4 | 0.4 | 0.4 | 0.4 | 0.4 | 0.4 |
| ZDBP[5] | 1.5 | 1.5 | 1.5 | 1.5 | 1.5 | 1.5 |
| Sulfur | 0.5 | 0.5 | 0.5 | 0.5 | 0.5 | 0.5 |
| Physical Properties | | | | | | |
| Torque (60)[6], cN.m | 6.78 | 15.82 | 28.25 | 25.96 | 9.04 | 28.25 |
| Tensile Strength, original, MPa | 0.64 | 3.61 | 1.18 | 0.70 | 0.92 | 0.47 |
| Tensile Strength, aged[7] | 3.03 | 8.69 | 8.07 | 3.24 | 5.52 | 8.89 |
| Tensile Strength change, % | +373 | +141 | +584 | +363 | +500 | +1791 |
| Elongation, % original | 370 | 460 | 490 | 400 | 700 | 560 |

[1]EPDM contained 100 pts extender oil, no additional oil was introduced.
[2]Magnesium silicate, particle size 6 micron or less.
[3]Mercaptobenzothiazole.
[4]Zinc dimethyldithiocarbamate.
[5]Zinc O,O—din-butylphosphorodithioate.
[6]Rheometer test at 100° C.; increase in torque between minimum value and 60 minutes value.
[7]Aged 28 days at 70° C., air circulating oven.

The data in Table III establishes that compositions within the contemplation of this invention provide excellent cure development even when employing a variety of EPDM's and a combination of DPTH and other accelerators.

EXAMPLE 4

Roof sheeting samples were prepared by formulating three additional compositions, Samples 16–18. These samples were aged, both in an air circulating oven and outdoors on a roof in Naugatuck, Conn. Table IV summarizes the composition of the roof sheeting samples of this example, as well as the results of the physical tests to which these samples were put, after aging in an air oven and on a roof.

TABLE IV

| Constituents, parts by wt. | Sample No. 16 | 17 | 18 |
|---|---|---|---|
| EPDM, No. | IV | V | IX[1] |
| EPDM, amount | 200 | 100 | 140 |
| N 347 Carbon Black | 125 | 125 | 125 |
| Mineral filler[2] | 50 | 50 | 50 |
| Extender oil[3] | 10 | 85 | 55 |
| Zinc oxide | 5. | 5. | 5. |
| Stearic acid | 1. | 1. | 1. |
| DPTH | 0.3 | 0.3 | 0.3 |
| MBT | 0.3 | 0.3 | 0.3 |
| ZDDC | 0.3 | 0.3 | 0.3 |
| ZDBP | 1.5 | 1.5 | 1.5 |
| Sulfur | 0.5 | 0.5 | 0.5 |
| Physical Properties | | | |
| Original Tensile Strength, MPa | 1.72 | 1.06 | 6.63 |
| Original Elongation, % | 300 | 440 | 540 |
| Torque (60), cN.m[4] | 3.39 | 18.08 | 24.86 |
| Aged 28 days at 70° C. | | | |
| Tensile Strength, MPa | 5.38 | 6.90 | 11.45 |
| Tensile Strength change, % | 213 | 552 | 73 |
| Elongation, % | 440 | 420 | 430 |
| Aged 1 month, roof | | | |
| Tensile Strength, MPa | 2.14 | 3.79 | 8.83 |
| Tensile Strength change, % | 24 | 257 | 33 |
| Elongation, % | 340 | 390 | 420 |
| Aged 3 months, roof | | | |
| Tensile Strength, MPa | 2.53 | 5.03 | 10.0 |
| Tensile Strength change, % | 47 | 375 | 51 |
| Elongation, % | 370 | 360 | 390 |

[1]EPDM-IX: E(71.6)-P(23.9)ENB(4.5%) terpolymer containing oil (40 pph); ML-1 plus 4 at 100° C. = 55.
[2] and [3] as in Example 1.
[4]Rheometer test at 100° C.; increase in torque between minimum value and 60 minute value.

Example 4 establishes the practicality of employing the compositions of this invention as roof sheeting or flashing, not only by testing after simulated aging in an air circulating oven, but also after actual roof exposure aging.

EXAMPLE 5

Five additional samples, samples 19–23, were prepared to determine the effectiveness of compositions which comprise butyl rubber or EPDM-butyl rubber mixtures as the elastomer. It is noted that sample 19, which employs EPDM as the sole elastomer, is included for comparison purposes.

All the samples were prepared from a "master batch" in accordance with the procedure of Example 1. Of course, the master batches for each sample were appropriately modified to incorporate the proper concentration of butyl rubber in samples 20–23.

To these master batch samples was added additional additives whose concentration are summarized in Table V.

These samples were tested to obtain their torque characteristic. As stated above, torque is an indicia of the composition's curing characteristic. The torque of the samples tested is also tabulated in Table V.

TABLE V

| Constituents, Parts by Weight | Sample No. | | | | |
| --- | --- | --- | --- | --- | --- |
| | 19 | 20 | 21 | 22 | 23 |
| EPDM I | 50.0 | 37.5 | 25.0 | 12.5 | — |
| EPDM II | 50.0 | 37.5 | 25.0 | 12.5 | — |
| Butyl Rubber | — | 25.0 | 50.0 | 75.0 | 100 |
| N-347 Carbon Black | 120 | 115 | 110 | 105 | 100 |
| Extender Oil | 85 | 80 | 75 | 70 | 65 |
| Mineral Filler | 50 | 45 | 40 | 35 | 30 |
| MBT | 0.6 | 0.6 | 0.6 | 0.6 | 0.6 |
| ZDDC | 0.6 | 0.6 | 0.6 | 0.6 | 0.6 |
| ZBPD | 1.5 | 1.5 | 1.5 | 1.5 | 1.5 |
| DPTH | 0.6 | 0.6 | 0.6 | 0.6 | 0.6 |
| Sulfur | 0.5 | 0.5 | 0.5 | 0.5 | 0.5 |
| Physical Property | | | | | |
| Torque (60) cN.m | 40.7 | 42.5 | 44.2 | 45.1 | 45.1 |

Note:
All symbols as defined or described in previous examples.

This example illustrates the effectiveness of samples using butyl rubber or EPDM-butyl rubber samples as the elastomer. Samples incorporating butyl rubber alone or in combination with EPDM all have curing characteristics slightly superior to the good curing property exhibited by EPDM.

The detailed description and examples given above are provided to illustrate the scope and spirit of the instant invention. These embodiments and examples will suggest to others, skilled in the art, other embodiments and examples within the scope of this invention. Such embodiments and examples are within the contemplation of this invention. Therefore, the scope of this invention should be limited only by the appended claims.

What is claimed is:

1. A roofing composition, said composition selected from the group consisting of roof sheeting and roof flashing, comprising:
   (a) 100 parts of an elastomer selected from the group consisting of ethylene-propylene-non-conjugated diene terpolymer, butyl rubber and mixtures thereof;
   (b) 0.1 to 3.0 parts of a compound having the structural formula $[(CH_2)_nNCS)]_2S_6$ wherein n is 4 or 5; and
   (c) 0.4 to 5.0 parts of a sulfur donor curative;
wherein said components (b) and (c) provide at least 0.25 part of total available sulfur; said composition not containing bitumen; and all said parts being by weight.

2. A roofing composition in accordance with claim 1, wherein said component (b) is dipentamethylenethiuram hexasulfide.

3. A roofing composition in accordance with claim 1, wherein said component (c) selected from the group consisting of sulfur, dimethyl-diphenylthiuram disulfide, dipentamethylenethiuram disulfide, tetraethylthiuram disulfide, tetramethylthiuram disulfide, alkyl disulfides, selenium diethyldithiocarbamate, selenium dimethyldithiocarbamate, 4,4'-dithiodimorpholine, N,N'-dithiobis(hexahydro-2H-azepinon-2) and mixtures of the above compounds.

4. A roofing composition in accordance with claim 3, wherein said component (c) is sulfur.

5. A roofing composition in accordance with claim 1, wherein said component (b) is present in a concentration of 0.2 to 2.0 parts, and said component (c) is present in a concentration of 0.4 to 3.0 parts, all said parts being by weight.

6. A roofing composition in accordance with claim 5, wherein said component (b) is present in a concentration of 0.3 to 1.2 parts, and said component (c) is present in a concentration of 0.5 to 2.0 parts, all said parts being by weight.

7. A roofing composition in accordance with claim 1, including an accelerator, said accelerator characterized by the absence of sulfur donor capability.

8. A roofing composition in accordance with claim 7, wherein said accelerator is selected from the group consisting of dialkylthiourea; trialkylthiourea; tetraalkylthiourea; 2-mercaptoimidazoline; N,N'-diphenylguanidine; N,N-di(2-methylphenyl)guanidine; salts of dialkyldithiocarbamates, where the alkyl group has 1 to 6 carbon atoms and said salts are formed from bismuth, cadmium, copper, iron, lead, potassium, selenium, sodium, tellurium, or zinc; mono-alkylamines; dialkylenethiuram or tetraalkylthiuram monosulfides, where the alkyl or alkylene groups have from 1 to 8 carbon atoms; mercaptobenzothiazole; 4-morpholinylbenzothiazyl disulfide; zinc mercaptobenzothiazole; and mixtures of the above compounds.

9. A roofing composition in accordance with claim 1, comprising at least one processing oil.

10. A roofing composition in accordance with claim 1, comprising at least one plasticizer.

11. A roofing composition in accordance with claim 1, comprising at least one filler and reinforcing agent.

12. A roofing composition in accordance with claim 11, wherein said filler and reinforcing agent are selected from the group consisting of carbon black, silicates, talc, clay, calcium carbonate, and mixtures thereof.

* * * * *